(No Model.)

C. BULLOCK.
RING FOR CABLE COVERING.

No. 335,679. Patented Feb. 9, 1886.

WITNESSES:
Clarence S. Palmer.
Kenneth McC. DeWeese,

INVENTOR
Chester Bullock

UNITED STATES PATENT OFFICE.

CHESTER BULLOCK, OF KANSAS CITY, MISSOURI.

RING FOR CABLE-COVERINGS.

SPECIFICATION forming part of Letters Patent No. 335,679, dated February 9, 1886.

Application filed September 24, 1885. Serial No. 178,105. (No model.)

*To all whom it may concern:*

Be it known that I, CHESTER BULLOCK, a citizen of the United States, residing in Kansas City, in the county of Jackson and State of Missouri, have invented a new and useful Improvement in Rings for Cable-Coverings, of which the following is a specification.

My invention relates to improvements in rings for covering traction-cables to protect them from wear while passing over sheaves or pulleys or other matters that may come in contact while in motion and from the wear of the grip that conveys the power from the cable to the car or vehicle, and relates more especially to the sectional ring mentioned and described in patent granted to Chester Bullock, April 7, 1885, No. 314,995, and I attain this object by the mechanism illustrated in the accompanying drawings, in which—

Figure 1:
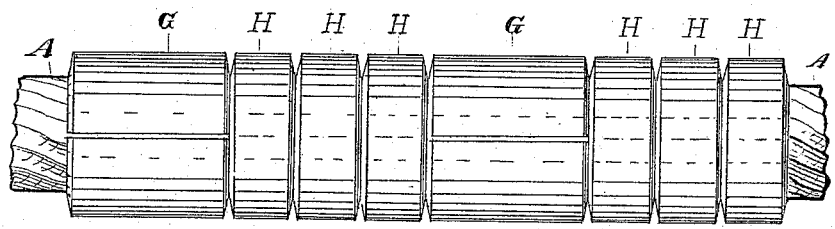
Figure 2:
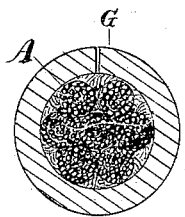
Figure 3:
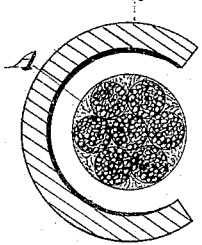
Figure 4:
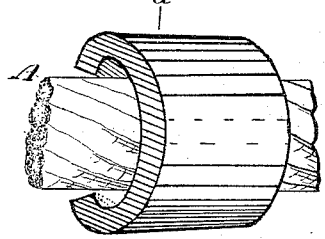

Figure 1 is a view of the cable with improved rings (letters G) interspersed with plain seamless rings (letters H) in place. Fig. 2 is an end sectional view of improved ring and cable. Fig. 3 is an end sectional view of the cable with like view of the ring while in the form of a circle, previous to being closed or pressed into a ring around the cable. Fig. 4 is a perspective view of the ring encircled around the cable before being pressed into a ring around the cable in place.

Similar letters refer to similar parts throughout the several views.

A represents the cable.

H represents the plain seamless or loose rings placed on the cable before it is made continuous.

G represents the improved rings to be used in covering that part of the cable that cannot be covered by the plain seamless rings after it has been spliced and made continuous. It is made from a plain bar of metal about one and one-fourth inch in width, and the thickness of the other rings to be used in covering the balance of the cable, and cut the required length to encircle the cable; then bent and placed on the endless traction-cable, as represented in Figs. 3 and 4, when it is pressed or closed into a ring around the cable, as shown in Figs. 1 and 2.

When placed upon the cable, these improved rings should be interspersed with the seamless rings, that the pressure of the grip when brought to bear upon the cable or rings will bear equally upon the rings.

I am aware that sectional rings with wires to connect the parts, in combination with traction-cable, for the purpose of covering that portion of the cable that cannot be covered by plain seamless rings after the cable has been united and become continuous, have been patented. I therefore do not claim such a combination, broadly; but What I do claim as my invention, and desire to secure by Letters Patent, is—

1. A loose ring or rings with a single seam or joint placed on and covering portions of an endless traction-cable, as described, and for the purpose set forth.

2. A ring of a single seam or joint, covering portions of an endless traction-cable, in combination with seamless rings, as shown, and for the purpose set forth.

CHESTER BULLOCK.

Witnesses:
CLARENCE S. PALMER,
KENNETH McC. DEWEESE.